(12) United States Patent
Chen et al.

(10) Patent No.: US 7,970,165 B2
(45) Date of Patent: Jun. 28, 2011

(54) SYSTEM AND METHOD FOR WATERMARKING DATA

(75) Inventors: Chia Ping Chen, Kaohsiung (TW); Yi-Lang Liu, Siansi Township (TW)

(73) Assignees: Taiwan Semiconductor Manufacturing Company, Ltd., Hsin-Chu (TW); Global Unichip Corp., Hsinchu (TW)

( * ) Notice: Subject to any disclaimer, the term of this patent is extended or adjusted under 35 U.S.C. 154(b) by 1141 days.

(21) Appl. No.: 11/717,402

(22) Filed: Mar. 13, 2007

(65) Prior Publication Data

US 2008/0226118 A1 Sep. 18, 2008

(51) Int. Cl.
*G06K 9/00* (2006.01)
*G06K 9/36* (2006.01)
*H04K 3/00* (2006.01)
*H04N 1/40* (2006.01)
*H04L 9/32* (2006.01)

(52) U.S. Cl. ............ 382/100; 382/232; 380/1; 358/3.28; 713/176

(58) Field of Classification Search .................. None
See application file for complete search history.

(56) References Cited

U.S. PATENT DOCUMENTS

| | | | |
|---|---|---|---|
| 5,875,249 A | 2/1999 | Mintzer et al. | |
| 6,477,276 B1 | 11/2002 | Inoue et al. | |
| 6,535,616 B1 | 3/2003 | Hayashi et al. | |
| 6,704,431 B1 | 3/2004 | Ogawa et al. | |
| 6,724,913 B1 | 4/2004 | Chen et al. | |
| 6,725,372 B1 | 4/2004 | Lewis et al. | |
| 6,975,733 B1 | 12/2005 | Choi et al. | |
| 7,013,023 B2 | 3/2006 | Ehrmann Patin et al. | |
| 7,085,398 B2 | 8/2006 | Baudry et al. | |
| 2005/0053239 A1* | 3/2005 | Nomizu et al. | 380/220 |

FOREIGN PATENT DOCUMENTS

| | | |
|---|---|---|
| JP | 3-39789 | 2/1991 |
| JP | 9-18875 | 1/1997 |
| JP | 11-196262 | 7/1999 |
| JP | 2000-13587 | 1/2000 |
| JP | 2000-174628 | 6/2000 |
| JP | 2000-332988 | 11/2000 |
| JP | 2005-210704 | 8/2005 |

OTHER PUBLICATIONS

Wong et al., "Data hiding technique in JPEG compressed domain", Proceedings vol. 4314, Security and Watermarking of Multimedia Contents III, Aug. 2001, pp. 309-320.*

* cited by examiner

*Primary Examiner* — Tom Y Lu
*Assistant Examiner* — Thomas A Conway
(74) *Attorney, Agent, or Firm* — Slater & Matsil, L.L.P.

(57) ABSTRACT

System and method for digitally watermarking data. A preferred embodiment comprises a quantizer to limit a data value provided by a signal input to a set of values, a rounder unit coupled to the quantizer, a control unit coupled to the rounder unit and to a watermark input, and a multiplexer having a first input coupled to the rounder unit and a control input coupled to the control unit. The rounder unit rounds a quantized data value to a nearest integer, the control unit provides a control signal based on the rounded, quantized data value and a parity of a watermark provided by the watermark input, and the multiplexer selects between an output of the rounder unit, an incremented output of the counter unit, and a decremented output of the counter unit, based on the control signal provided by the control unit.

16 Claims, 4 Drawing Sheets

SYSTEM AND METHOD FOR WATERMARKING DATA

TECHNICAL FIELD

The present invention relates generally to a system and a method for displaying images, and more particularly to a system and a method for digitally watermarking data.

BACKGROUND

Digital watermarks (or simply, watermarks) are, most commonly, information or messages that are added to digital data, such as image, audio, video, document, and so forth, files. The information may typically be used to add copyright notices, security information, and so on, to the digital data, and may often be undetectable or practically undetectable. For example, the information may be used to denote the creator of an image or song. Alternatively, the information may be used as verification information to authenticate a file or to ensure that a file has not been altered (maintain file integrity).

A technique used to insert a digital watermark may involve spatially inserting the digital watermark into a file. For example, a creator's name inserted in a portion of an image or a digital watermark placed at some position of an audio file, such as, the beginning, middle, or end of the audio file. Another technique used to insert a digital watermark may involve inserting the digital watermark into a frequency domain representation of the file. Inserting a frequency domain representation of a digital watermark may result in a digital watermark that may both be difficult to detect and remove.

One disadvantage of the prior art technique using spatial watermarks is that in many cases, the spatial watermark can readily be removed, for example, by cropping or editing. When a watermark is easily removed, the security provided by the watermark is limited.

Another disadvantage of the prior art techniques is that simply inserting a watermark, either spatially or in the frequency domain, may result in a watermark that distorts the digital data, for example, visual distortion in an image file or audibly detectable distortion in an audio file.

SUMMARY OF THE INVENTION

These and other problems are generally solved or circumvented, and technical advantages are generally achieved, by preferred embodiments of the present invention which provides a system and a method for digitally watermarking digital data.

In accordance with a preferred embodiment of the present invention, a circuit for embedding watermarks is provided. The circuit includes a quantizer to limit a data value provided by a signal input to a set of values, a rounder unit coupled to the quantizer, a control unit coupled to the rounder unit and to a watermark input, and a multiplexer having a first input coupled to the rounder unit and a control input coupled to the control unit. The rounder unit rounds a quantized data value to a nearest integer, the control unit provides a control signal based on the rounded, quantized data value and a parity of a watermark provided by the watermark input, and the multiplexer selects between an output of the rounder unit, an incremented output of the counter unit, and a decremented output of the counter unit, based on the control signal provided by the control unit.

In accordance with another preferred embodiment of the present invention, a method for watermarking digital data is provided. The method includes quantizing the digital data, rounding the quantized digital data, and storing the rounded, quantized digital data in response to a determining that a parity of the rounded, quantized digital data and a parity of a watermark is the same. The method also includes changing the parity of the rounded, quantized digital data in response to a determining that the parity of the rounded, quantized digital data and the parity of a watermark are different, and storing the incremented or the decremented rounded, quantized digital data.

In accordance with another preferred embodiment of the present invention, a method for recovering a watermark is provided. The method includes receiving a plurality of data values, wherein the plurality comprises a set of selected data values, and for each data value in the set of selected data values, assigning a value to the watermark based on the parity of the data value.

An advantage of a preferred embodiment of the present invention is that very small watermarks, as small as a single bit, may be used. The small watermarks may have a very small effect on the digital data and in many instances may be undetectable.

A further advantage of a preferred embodiment of the present invention is that the insertion and detection of watermarks in a digital file may be performed with a small investment in additional hardware.

Yet another advantage of a preferred embodiment of the present invention is that watermarks of different sizes may be inserted and detected. Without a limit on the size of the watermarks, the size of the watermarks may be determined by a desired impact on the digital data, for example, degradation to image quality.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an encoder and decoder for JPEG compressed images. The invention may also be applied, however, to encoders and/or decoders for other types of image files as well as other forms of digital data files, such as audio, video, data, and so forth, files.

Figures 1A, 1B, 1C:
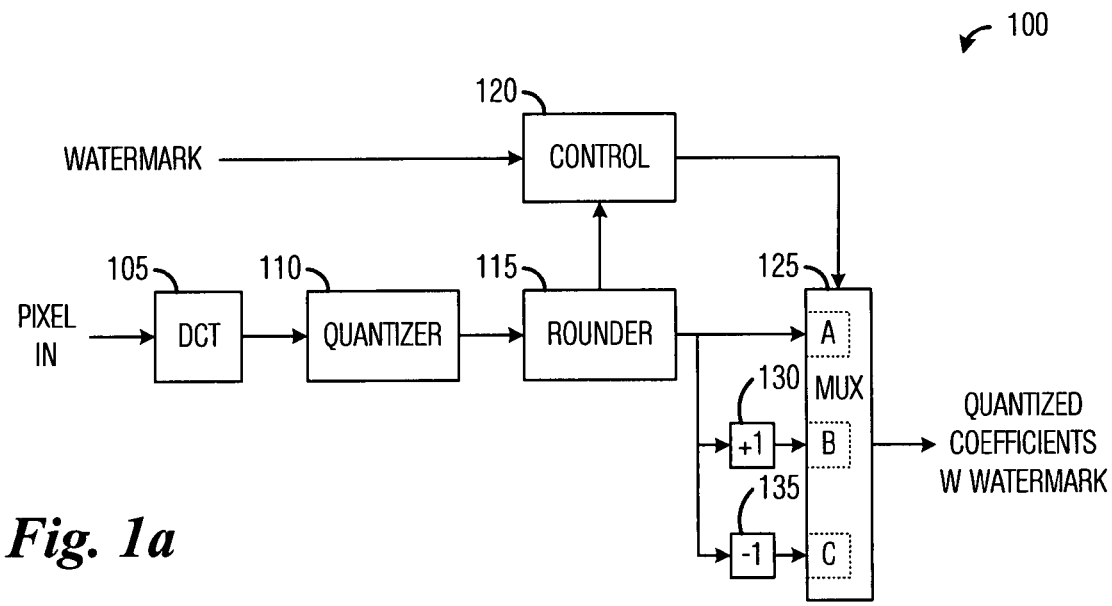
FIGS. 1a through 1c are diagrams of a JPEG encoder with a watermark encoder and examples of digital data blocks before and after insertion of a watermark.

With reference now to FIGS. 1a through 1c, there are shown diagrams illustrating a JPEG encoder with a watermark encoder and examples of digital data blocks before and after insertion of a watermark. The diagram shown in FIG. 1a illustrates an exemplary JPEG encoder 100, which includes a discrete cosine transform unit (DCT) 105. The DCT 105 may be responsible for applying a discrete cosine transform on input blocks of pixels (input blocks of digital data) provided by a pixel in input. The discrete cosine transform may convert the input block of digital data into a frequency domain representation. According to a JPEG standard, the input blocks of pixels are manipulated in the form of 8×8 pixel blocks. However, the present invention is applicable to blocks of data of arbitrary size. Additionally, data other than image data, such as audio data, video data, and so forth, may be watermarked. Therefore, the discussion of the image data being in the form of 8×8 blocks should not be construed as being limiting to either the scope or the spirit of the present invention.

After transformation into the frequency domain, a quantizer 110 may be used to reduce the amount of frequency domain information in the block of digital data. The quantizer 110 may divide each data value in the input block of digital data after transformation into the frequency domain by a specified value, with each data value in the input block of digital data potentially being divided by a different specified value. Then, a rounder 115 may round the quantized value to a nearest integer. The quantizer 110 and the rounder 115 may perform the majority of the lossy data compression involved in JPEG compression. A reason that the data loss is not easily noticed by the human eye is that the human eye is not particularly sensitive to accurately detecting variations in high frequency brightness, although it may be good at detecting small differences in brightness over large areas.

An output (a quantized and rounded coefficient) of the rounder 115 may then be provided to a control unit 120 and a multiplexer 125. The control unit 120 may be used to generate a control signal that may be provided to the multiplexer 125 to select the insertion of a watermark into a quantized and rounded data value in the block of digital data. The multiplexer 125 may, depending on the value of the control signal provided by the control unit 120, select a data value to be inserted into an output block of digital data. The control unit 120 may implement different control functions depending on desired parity for the output block of digital data, the number of bits in the watermark, the value of the bits in the watermark, and so forth.

Depending on implementation, only a certain number of outputs of the rounder 115 (quantized and rounded coefficients) may have the watermark applied. If the watermark is applied to a large number of quantized and rounded coefficients, then the impact of the watermark may be noticeable, for example, degraded image quality. The actual quantized and rounded coefficients selected for application of the watermark may depend on the number of coefficients to be used and may be specifically chosen to minimize impact on image quality. The actual coefficients selected may be specified beforehand and known by both the JPEG encoder and a corresponding JPEG decoder, or the coefficients may be selected at encoding and a list of the coefficients may be provided at decoding, or the coefficients may be randomly (or pseudorandomly) selected.

According to an embodiment, the watermark may be an N-bit value. The watermark may then be embedded in the block of digital data by embedding a single bit of the N-bit value with a data value. Therefore, with the N-bit watermark, N data values from the block of digital data may each be embedded with a single bit of the watermark. The spreading of the watermark over the multiple data values may help to reduce the impact on the image quality.

For example, in a preferred watermarking process that may change the output of the rounder 115 (a quantized and rounded coefficient) to have an even parity with a specification of an even parity being denoted with a '0' and an odd parity being denoted with a '1,' then it would be preferred to modify quantized and rounded coefficients to be even. However, if the quantized and rounded coefficient (the output of the rounder 115) already had the same parity as a particular bit of the watermark, then the quantized and rounded coefficient would be kept at its original value. This may be achieved by generating a control signal to select input "A" of the multiplexer 125, for example. However, if the parity of the quantized and rounded coefficient and the particular bit of the watermark were different and if the quantized and rounded coefficient was rounded DOWN to the nearest integer, then to embed the watermark information, the quantized and rounded coefficient may be incremented by one (1). This may be achieved by generating a control signal to select input "B" of the multiplexer 125, passing through an incrementer 130. Furthermore, if the parity of the quantized and rounded coefficient and the particular bit of the watermark were different and if the quantized and rounded coefficient was rounded UP to the nearest integer, then to embed the watermark information, the quantized and rounded coefficient may be decremented by one (1). This may be achieved by generating a control signal to select input "C" of the multiplexer 125, passing through a decrementer 135.

Alternatively, the quantized and rounded coefficient may have an odd parity with a specification that an even parity being denoted with a '1' and an odd parity being denoted with a '0,' or an even parity with a specification that an even parity being denoted with a '1' and an odd parity being denoted with a '0,' or an even parity with a specification that an even parity being denoted with a '0' and an odd parity being denoted with a '1.'

Using the example discussed above, where a preferred watermarking process that may change the output of the rounder 115 to have an even parity with a specification that an even parity being denoted with a '0' and an odd parity being denoted with a '1' with a watermark with a value "01," then it would be preferred to modify quantized and rounded coefficients to be even, then a first quantized and rounded coefficient located at coordinate (0, 0) of a block of digital data with a value of −61 (shown as element 155 in FIG. 1b) may be decremented by one (1) to have the bit "0" of the watermark embedded since the parities do not match and the quantized and rounded coefficient (−61) was rounded UP in the rounder 115 to make the parity be even (shown as element 175 in FIG. 1c). However, a second quantized and rounded coefficient located at coordinate (3, 2) of a block of digital data with a value of −3 (shown as element 157 in FIG. 1b) may be left unchanged (shown as element 177 in FIG. 1c) since the parity of the second quantized and rounded coefficient matches the parity of bit "1" of the watermark (both being odd).

Figure 2A:
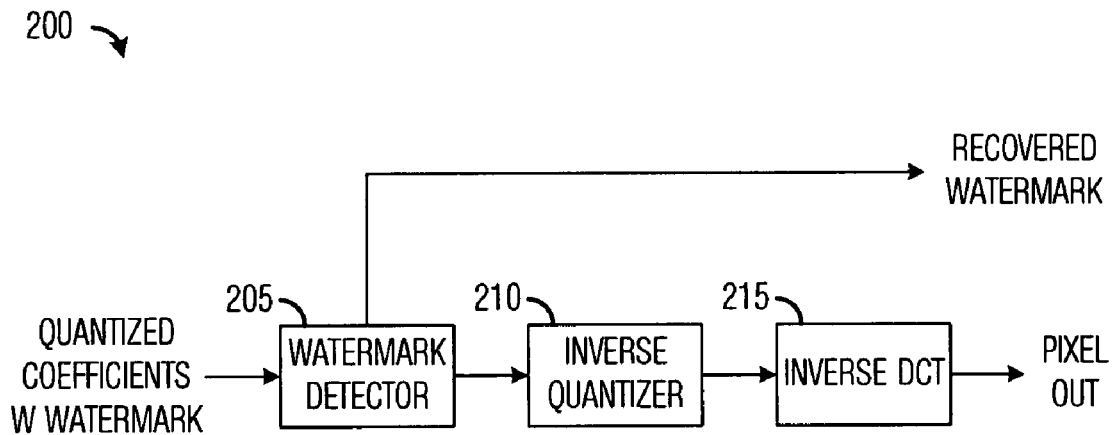
FIGS. 2a and 2b are diagrams of a JPEG decoder with a watermark detect and recover circuit and an example of a digital data block processed to detect and recover an embedded watermark.
Figure 2B:
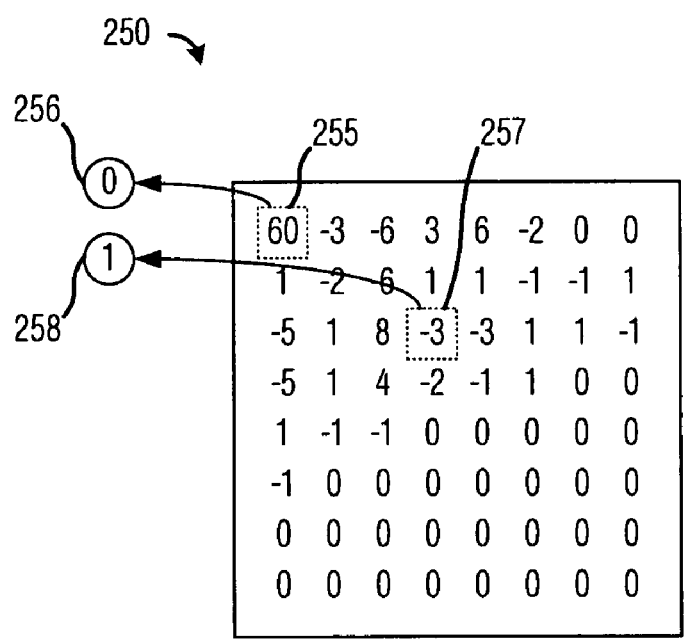

With reference now to FIGS. 2a and 2b, there are shown diagrams of a JPEG decoder with a watermark detect and recover circuit and an example of a digital data block processed to detect and recover an embedded watermark. The diagram shown in FIG. 2b illustrates a JPEG decoder 200, which includes a watermark detector unit 205. The watermark detector unit 205 may be used to detect the watermarks embedded in the data (quantized and rounded coefficients with embedded watermark) provided to the JPEG decoder 200 and recover the watermark. The quantized and rounded coefficients with embedded watermark may then be provided to an inverse quantizer 210 that reverses the quantization performed by a quantizer (such as the quantizer 110 (FIG. 1a)) by multiplying each quantized and rounded coefficient with embedded watermark with a specified value, preferably the same specified value used by a quantizer during JPEG encoding. Each quantized and rounded coefficient with embedded watermark may be multiplied with a different specified value. An inverse discrete cosine transform unit (inverse DCT) 215 can transform the quantized and rounded coefficients with embedded watermark back into a time domain representation, producing pixels that may be used to display the JPEG compressed image.

The watermark detector 205 may operate by selecting a number of quantized and rounded coefficients with embedded watermark, with the number and location of the coefficients in the block of digital data either being specified beforehand or provided to the watermark detector 205 prior to operation. Then, based on each selected quantized and rounded coefficient with embedded watermark, the watermark detector 205 can recover the watermark. Referring now to the diagram shown in FIG. 2b, there is shown a block of digital data 250 with elements 255 and 257 containing embedded watermark information. Based on an agreed upon convention, for example, an even coefficient representing a binary "0" and an odd coefficient representing a binary "1," then the watermark recovered from elements 255 and 257 may be "01," since element 255 is even (therefore representing bit value "0" as shown at 256) and element 257 is odd (therefore representing bit value "1" as shown at 258).

Figure 3:
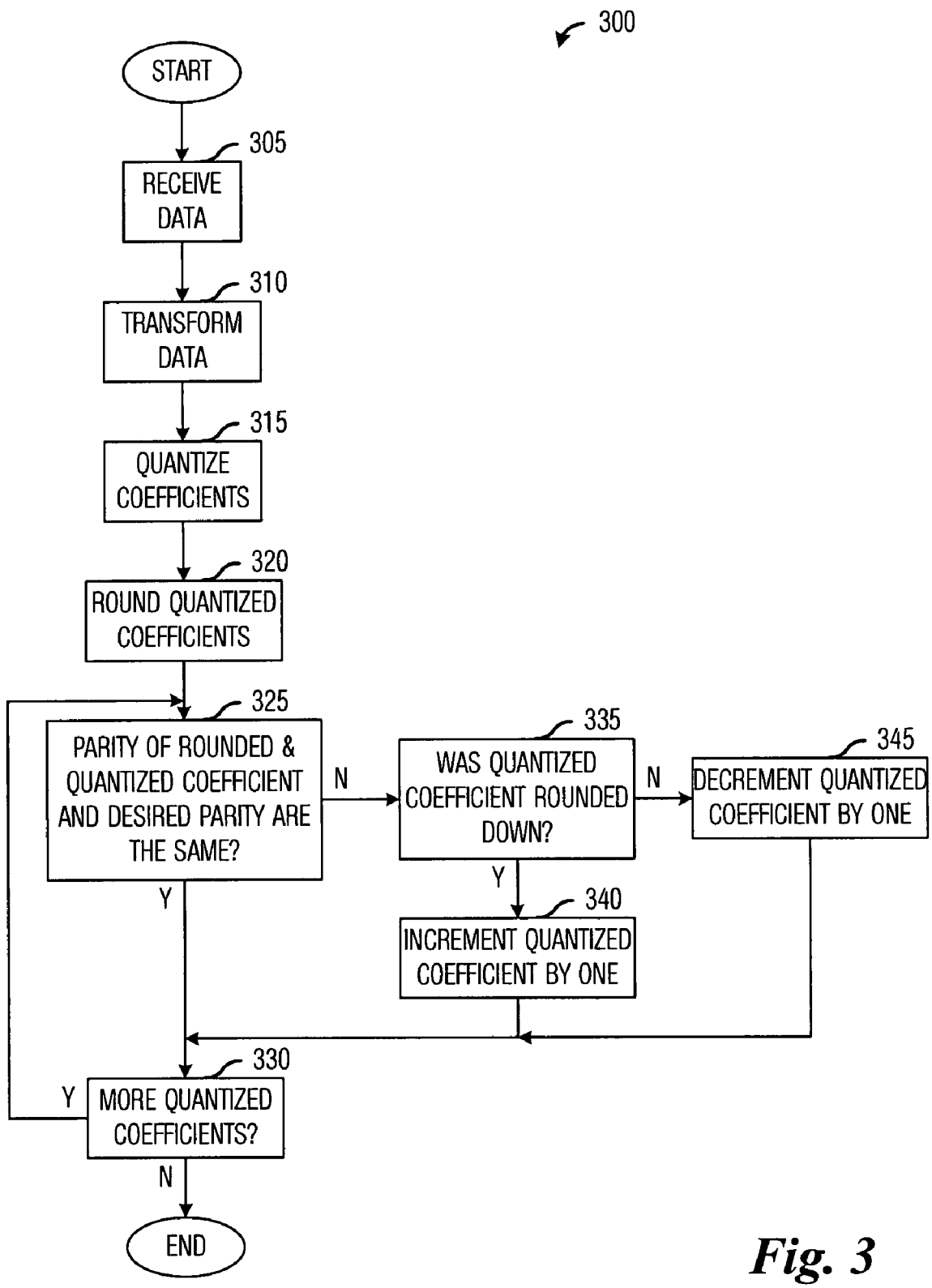
FIG. 3 is a flow diagram of an algorithm to embed a watermark into digital data.

With reference now to FIG. 3, there is shown a flow diagram of an algorithm 300 to embed a watermark into digital data. The embedding of a watermark into digital data may begin with the receipt of digital data, typically in block form (block 305), which may then be transformed into a frequency domain representation, such as by a discrete cosine transform (block 310). Other transformations may also be used, such as a Fourier transform, a Fast Fourier transform, wavelet transform, and so forth. The frequency domain representation of the digital data may then be quantized by dividing with a specified value (block 315). Each data value in the frequency domain representation may be divided by a single specified value or each may be divided by different specified values. After quantization, the data values in the frequency domain representation may be rounded to nearest integers (block 320).

After rounding, selected data values may be selected for watermark embedding. The data values may be selected due to their position in the block of digital data. The selection of the data values may be based upon a specified list of data values known to both a watermark embedding algorithm and a watermark recovering algorithm. The specified list may be based on some mathematical or logical function, such as a pseudorandom sequence, for example. Alternatively, the data values may be selected by a watermark embedding algorithm and a list of the selected data values may be provided to a watermark recovery algorithm.

For each of the selected data values, the data value's parity may be compared with the parity of the watermark (a single bit of the watermark or multiple bits of the watermark). If the parities are the same (block 325), then the data value is not changed and the comparison may be repeated with any remaining selected data values (block 330). However, if the parities are not the same, then a check may be made to determine the rounding operation performed on the data value (block 335). For example, a check may be made to determine if the data value was rounded DOWN in the routing operation. If the data value was rounded DOWN, then the data value may be incremented by one to properly set the parity of the data value (block 340). If the data value was not rounded DOWN (i.e., the data value was rounded UP), then the data value may be decremented by one to properly set the parity of the data value (block 345). It may be possible to increment and decrement the data value by other odd values to properly set the parity of the data value. However, the use of values other than one may result in more impact on the image quality.

Figure 4:
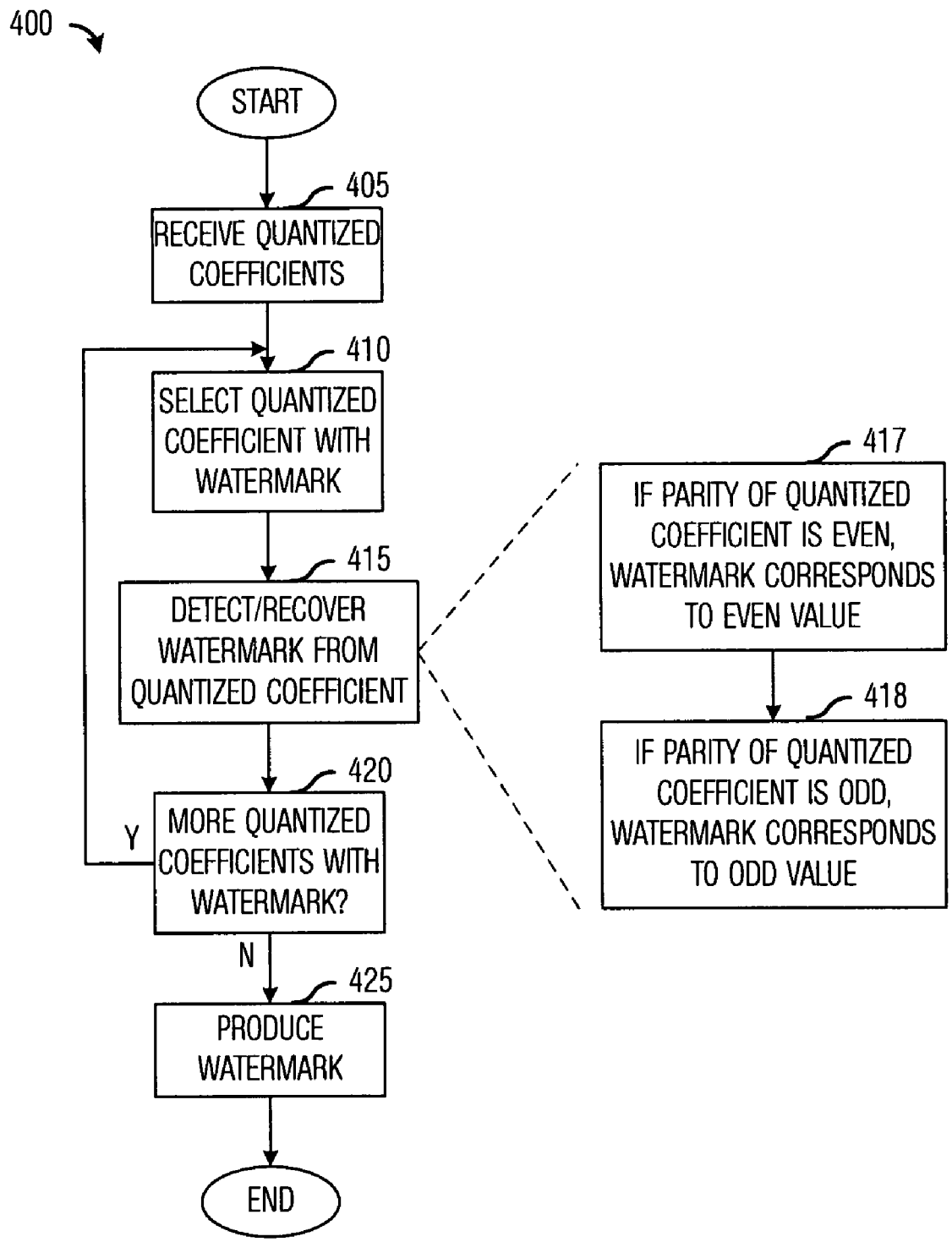
FIG. 4 is a flow diagram of an algorithm to detect and recover an embedded watermark from digital data.

With reference now to FIG. 4, there is shown a flow diagram of an algorithm 400 to detect and recover an embedded watermark from digital data. The detecting and recovery of an embedded watermark from digital data may begin with the receipt of digital data, typically in block form (block 405). Once the digital data has been received, certain data values in the digital data may be selected for processing (block 410). These data values may contain embedded watermark information and may be specified beforehand in a list provided by an algorithm that may be used for embedding watermarks, for example. The embedded watermark information may then be detected and recovered from the data values (block 415).

The detection and recovery of the watermark may be performed by determining the parity of the selected data values. For example, if the parity of a selected data value is even, then the watermark embedded in the selected data value may be assigned a value that represents an even parity, for example, a "0" (block 417). If the parity of a selected data value is odd, then the watermark embedded in the selected data value may be assigned a value that represents an odd parity, for example, a "1" (block 418). The detection and recovery of the watermark may be repeated for each selected data value (block 420). Once all of the selected data values have been processed, the watermark that was embedded in the digital data may be produced by combining the recovered watermarks from each of the selected data values (block 425).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit for embedding watermarks, the circuit comprising:
   a quantizer to limit a data value provided by a signal input to a set of values;
   a rounder unit coupled to the quantizer, the rounder unit configured to round a quantized data value to a nearest integer;
   a control unit coupled to the rounder unit and to a watermark input, the control unit configured to provide a control signal based on the rounded, quantized data value and a parity of a watermark provided by the watermark input; and
   a multiplexer having a first input coupled to the rounder unit and a control input coupled to the control unit, the multiplexer configured to select between an output of the rounder unit when the parity of the rounded, quantized data value and the parity of a bit of the watermark are the same, and an incremented output of the rounder unit or a decremented output of the rounder unit when the parity of the rounded, quantized data value and the parity of the bit of the watermark are different, based on the control signal provided by the control unit.

2. The circuit of claim 1, wherein the watermark comprises a multi-bit value, and wherein the control unit provides the control signal based on a combination of the rounded, quantized data value and a single bit of the watermark.

3. The circuit of claim 1, wherein the data value is selected from a block of data values.

4. The circuit of claim 1, wherein the control unit produces a control signal that results in the multiplexer selecting the incremented output of the rounder unit based on a comparison that the parity of the rounded, quantized data value and the parity of the watermark are different and that the output of the rounder unit is smaller than the data value.

5. The circuit of claim 1, wherein the control unit produces a control signal that results in the multiplexer selecting the decremented output of the rounder unit based on a comparison that the parity of the rounded, quantized data value and the parity of the watermark are different and that the output of the rounder unit is larger than the data value.

6. The circuit of claim 1, wherein the incremented output of the rounder unit comprises the output of the rounder unit plus one and wherein the decremented output of the rounder unit comprises the output of the rounder unit minus one.

7. The circuit of claim 1, further comprising, a transform unit coupled in between the signal input and the quantizer, the transform unit configured to transform the data value into a frequency domain representation.

8. The circuit of claim 7, wherein the transformation performed by the transform unit comprises a discrete cosine transform.

9. The circuit of claim 8, wherein the circuit embeds watermarks in JPEG compressed image data.

10. A method for watermarking digital data, the method comprising:
    quantizing the digital data;
    rounding the quantized digital data;
    storing the rounded, quantized digital data in response to a determining that a parity of the rounded, quantized digital data and a parity of a watermark is the same;
    incrementing or decrementing the rounded, quantized digital data in response to a determining that the parity of the rounded, quantized digital data and the parity of a watermark are different; and
    storing the incremented or the decremented rounded, quantized digital data.

11. The method of claim 10, wherein incrementing or decrementing comprises:
    incrementing the rounded, quantized digital data in response to a determining that the rounding comprises reducing the value of the quantized digital data; and
    decrementing the rounded, quantized digital data in response to a determining that the rounding comprises increasing the value of the quantized digital data.

12. The method of claim 11, wherein the incrementing comprises increasing the rounded, quantized digital data by one and the decrementing comprises decreasing the rounded, quantized digital data by one.

13. The method of claim 10, further comprising, prior to the quantizing, transforming the digital data.

14. The method of claim 13, wherein the transforming comprises performing a discrete cosine transform.

15. The method of claim 10, wherein the digital data comprises a block of data values, and wherein the storing the rounded, quantized digital data, the changing, and the storing the incremented or decremented rounded, quantized digital data is performed on a set of selected data values in the block of data values.

16. The method of claim 15, wherein the watermark comprises an N-bit value, and wherein the set of selected data values comprises N data values.

* * * * *